United States Patent
Dinh et al.

(10) Patent No.: US 7,562,365 B2
(45) Date of Patent: Jul. 14, 2009

(54) RANDOM ACCESS FOR PROCESSING MESSAGES IN A MESSAGE QUEUE

(75) Inventors: Hung The Dinh, Austin, TX (US); Teng S. Hu, Austin, TX (US); Phong Anh Pham, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 789 days.

(21) Appl. No.: 10/755,823

(22) Filed: Jan. 12, 2004

(65) Prior Publication Data

US 2005/0155041 A1  Jul. 14, 2005

(51) Int. Cl.
G06F 3/00 (2006.01)
G06F 9/44 (2006.01)
G06F 9/46 (2006.01)
G06F 13/00 (2006.01)

(52) U.S. Cl. .................................... 719/314
(58) Field of Classification Search ................ 719/314, 719/318
See application file for complete search history.

(56) References Cited

U.S. PATENT DOCUMENTS

| | | | | |
|---|---|---|---|---|
| 5,341,476 A * | 8/1994 | Lowell | ......................... | 709/219 |
| 5,592,672 A * | 1/1997 | Grewal et al. | ................. | 718/105 |
| 5,916,307 A * | 6/1999 | Piskiel et al. | ................. | 719/314 |
| 6,058,389 A | 5/2000 | Chandra et al. | ................. | 707/1 |
| 6,442,600 B1 * | 8/2002 | Anderson | ..................... | 709/217 |
| 6,519,686 B2 * | 2/2003 | Woodring et al. | ............ | 711/147 |
| 6,604,118 B2 * | 8/2003 | Kleiman et al. | .............. | 707/203 |
| 6,802,066 B1 * | 10/2004 | Carden, IV et al. | .......... | 719/312 |
| 7,185,034 B2 * | 2/2007 | Jain et al. | ..................... | 707/206 |
| 7,352,762 B2 * | 4/2008 | T V et al. | ...................... | 370/412 |
| 7,472,396 B2 * | 12/2008 | Jacobs et al. | ................. | 719/318 |
| 7,493,623 B2 * | 2/2009 | Ruutu | ......................... | 719/314 |
| 2001/0049702 A1 * | 12/2001 | Najmi | .......................... | 707/513 |
| 2003/0009602 A1 * | 1/2003 | Jacobs et al. | ................. | 709/318 |
| 2003/0182464 A1 * | 9/2003 | Hamilton et al. | ............. | 709/314 |
| 2003/0217092 A1 * | 11/2003 | Veselov | ........................ | 709/106 |
| 2004/0127284 A1 * | 7/2004 | Walker et al. | .................. | 463/30 |
| 2004/0205773 A1 * | 10/2004 | Carcido et al. | .............. | 719/318 |
| 2004/0240458 A1 * | 12/2004 | T V et al. | ...................... | 370/412 |

* cited by examiner

*Primary Examiner*—Li B Zhen
*Assistant Examiner*—KimbleAnn Verdi
(74) *Attorney, Agent, or Firm*—John R. Biggers; Jill Poimboeuf; Biggers & Ohanian LLP.

(57) ABSTRACT

Methods, systems, and products for random access for processing messages in a message queue that include creating a map relating message identification and message position, including adding an entry in the map whenever a message enters the queue; instantiating a plurality of consumers for the messages; and consuming, with the consumers, the messages in dependence upon the map. In typical embodiments, the plurality of consumers includes a particular number of consumers and such embodiments typically include assigning an ordinal value to each consumer and consuming the messages further comprises identifying the messages to be processed by each consumer in dependence upon the ordinal values, the number of consumers, and the message positions.

15 Claims, 6 Drawing Sheets

RANDOM ACCESS FOR PROCESSING MESSAGES IN A MESSAGE QUEUE

BACKGROUND OF THE INVENTION

1. Field of the Invention

The field of the invention is data processing, or, more specifically, methods, systems, and products for random access for processing messages in a message queue.

2. Description of Related Art

Message oriented middleware ("MOM") implements methods of communication between software components or applications. MOM system implement both point-to-point functionality and publish-subscribe functionality. In a point-to-point domain, one source application (a 'producer') produces messages for one destination application (a 'consumer'). Such a MOM system is often envisioned as a peer-to-peer facility in that any client application may function as either a producer or consumer depending on its function at any particular time. In client-server terms, that is, any client can produce or consume messages to or from any other client. Each MOM client typically connects to a messaging agent (sometime called a 'queue manager') that provides facilities for creating, sending, receiving, and reading messages.

MOM systems support distributed data communication that is loosely coupled and generally asynchronous. A producer component sends a message to a destination (typically a message queue), and a consumer recipient can retrieve the message from the destination. The producer and the consumer are not required to be available, on-line, or connected to one another for data communications in order to communicate. In fact, the producer does not need to know anything about the consumer, nor does the consumer need to know anything about the producer. The producer and consumer need to know only what message format and what destination (or message queue) to use. In this respect, messaging differs from tightly coupled technologies, such as the Common Object Request Broker Architecture ("CORBA") or Java's Remote Method Invocation ("RMI"), which require a calling application to know a remote application's methods.

A "message" is a unit of information transmitted electronically from one computer application to another. Examples of messages generally include email messages and messages in data communications protocols such as HTTP or TCP/IP. Many messages in embodiments according to the present invention are units of information communicated in message oriented middleware ("MOM"). MOM messages differ somewhat from many other kinds of messages. Email messages, for example, implement human-readable communications from a person to a person or from a software application to a person. HTTP messages represent requests for particular computer resources and responses to such requests. A MOM messages, however, is used for communications between software applications and other software applications to implement business logic. That is, a MOM message generally communicates input data for, or output data from, operation of some form of business logic, accounting, on-line sales or marketing, financial calculations, security services, and so on.

Examples of MOM systems include IBM's MQSeries products, JMS (the Java Message Service), and MSMQ (Microsoft Message Queuing). MOM systems in prior art typically store messages in queues and support sequential message consumption in modes such as FIFO, LIFO, or according to assigned priorities. In a MOM queue that implements prioritized message consumption, messages having the same priority may be consumed according to a sequential sub-rule such as FIFO or LIFO. With either option, a consumer application may specify a message identification, a unique identifier assigned by a queue manager, and continue reading messages from there. In such systems, however, that implement a point-to-point messaging domain, messages sometimes are often produced for a queue faster than a consumer can consume them, thus creating a processing bottleneck in a queue. There is therefore a continuing need to improvement in such messaging systems.

SUMMARY OF THE INVENTION

Methods, systems, and products are described for improving message queue operation by mapping messages identifications according to message position and instantiating more than one consumer to consume messages. Typical embodiments support the point-to-point domain, in which a producer may assume that its messages are for a single consumer. Typical embodiments make more than one consumer available to consume messages from a queue, thereby improving messaging performance, and they do so transparently to the producer and to the queue, neither of which ever knows that more than one consumer is in operation. In addition, because more than one consumer is extracting messages from a queue in an order determined in dependence upon a map rather than a queue sequence, from the point of view of a queue, the extraction sequence is non-sequential or random.

More particularly, this specification describes methods, systems, and products for random access for processing messages in a message queue that include creating a map relating message identification and message position, including adding an entry in the map whenever a message enters the queue; instantiating a plurality of consumers for the messages; and consuming, with the consumers, the messages in dependence upon the map. In typical embodiments, the plurality of consumers includes a particular number of consumers and such embodiments typically include assigning an ordinal value to each consumer and consuming the messages further comprises identifying the messages to be processed by each consumer in dependence upon the ordinal values, the number of consumers, and the message positions.

In typical embodiments, identifying the messages to be processed by each consumer in dependence upon the ordinal values, the number consumers, and the message positions is carried out by assigning for consumption by a consumer a message having a message position identified by adding the ordinal value of the consumer to the product of the number of consumers multiplied by the number of messages consumed by the consumer. In typical embodiments, instantiating a plurality of consumers includes registering the consumers with a queue manager and creating a snapshot of the map when a first consumer is registered, including moving to the snapshot all map entries in the map when the first consumer is registered.

In typical embodiments, instantiating a plurality of consumers includes determining a number of consumers in dependence upon the number of map entries in the snapshot. In typical embodiments, instantiating a plurality of consumers includes determining a number of consumers in dependence upon the number of map entries in the map. Many embodiments also include counting messages entering the queue; counting messages consumed by the consumers; and changing the number of consumers in dependence upon the number of messages consumed and the number of messages entering the queue.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Introduction

The present invention is described to a large extent in this specification in terms of methods for random access for processing messages in a message queue. Persons skilled in the art, however, will recognize that any computer system that includes suitable programming means for operating in accordance with the disclosed methods also falls well within the scope of the present invention. Suitable programming means include any means for directing a computer system to execute the steps of the method of the invention, including for example, systems comprised of processing units and arithmetic-logic circuits coupled to computer memory, which systems have the capability of storing in computer memory, which computer memory includes electronic circuits configured to store data and program instructions, programmed steps of the method of the invention for execution by a processing unit.

The invention also may be embodied in a computer program product, such as a diskette or other recording medium, for use with any suitable data processing system. Embodiments of a computer program product may be implemented by use of any recording medium for machine-readable information, including magnetic media, optical media, or other suitable media. Persons skilled in the art will immediately recognize that any computer system having suitable programming means will be capable of executing the steps of the method of the invention as embodied in a program product. Persons skilled in the art will recognize immediately that, although most of the exemplary embodiments described in this specification are oriented to software installed and executing on computer hardware, nevertheless, alternative embodiments implemented as firmware or as hardware are well within the scope of the present invention.

Random Access for Processing Messages in a Message Queue

Figure 1:
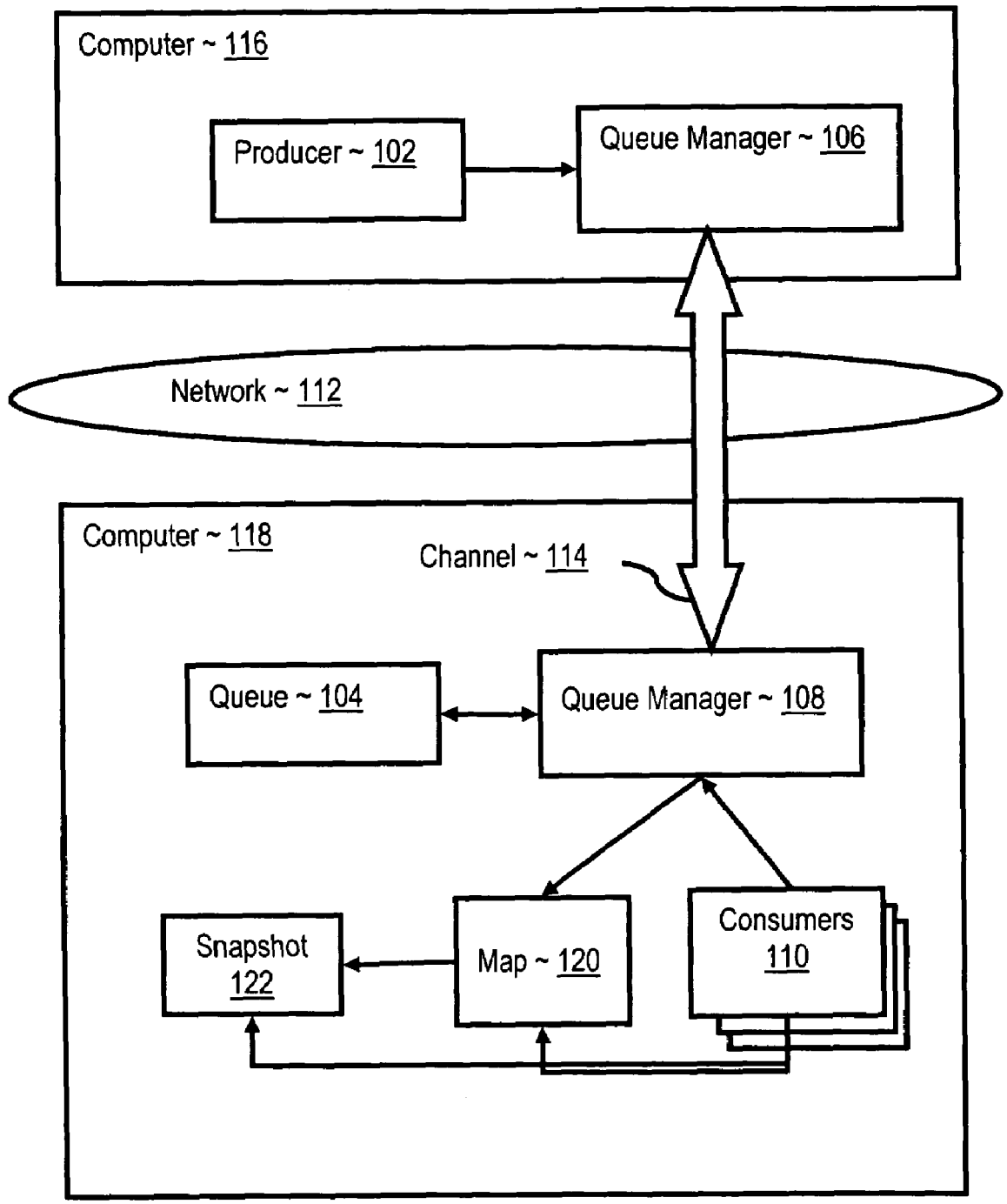
FIG. 1 sets forth a line drawing of an exemplary computer architecture in which may be implemented various exemplary embodiments of the present invention.

Methods, systems, and products are disclosed that implement random access for processing messages in a message queue with respect to the associated drawings, beginning with FIG. 1. FIG. 1 sets forth a line drawing of an exemplary computer architecture in which may be implemented various exemplary embodiments of the present invention. More particularly, FIG. 1 describes an exemplary architecture for a message oriented middleware system as may be implemented, for example, with IBM's MQSeries products, JMS (Java Message Service), the MSMQ (Microsoft Message Queuing), or other messaging systems as will occur to those of skill in the art.

The architecture of FIG. 1 includes a computer (116) connected for data communications through network (112) to computer (118) upon which is installed a message queue manager (108) that administers the operation of a message queue (104). Message queue (104) is a MOM destination, a container for messages, a multi-element data structure in which messages may be stored and removed.

A producer (102) is a computer application program that implements business logic and sends messages through a queue manager (106) through data communications channel (114) to queue manager (108) and then to the queue (104). Consumers (110) are also computer application programs that implement business logic. The consumers (110) take as inputs messages from queue (104) through queue manager (108) and may return output messages through the queue manager to the queue. In retrieving messages from queues and processing the messages according to business logic, consumer applications in this specification are said to "consume" messages.

In the architecture of FIG. 1, more than one consumer is instantiated to improve throughput in processing messages from queue (104). Consumers according to FIG. 1 use a map (120) or snapshot (122) to identify which messages in the queue to process. A map (120) is a data structure that relates message identification and message position. In many embodiments, map entries are added to the map whenever a message enters a queue. A snapshot (122) is a data structure that also relates message identification and message position and is typically created by moving map entries from the map to the snapshot.

Figure 2:
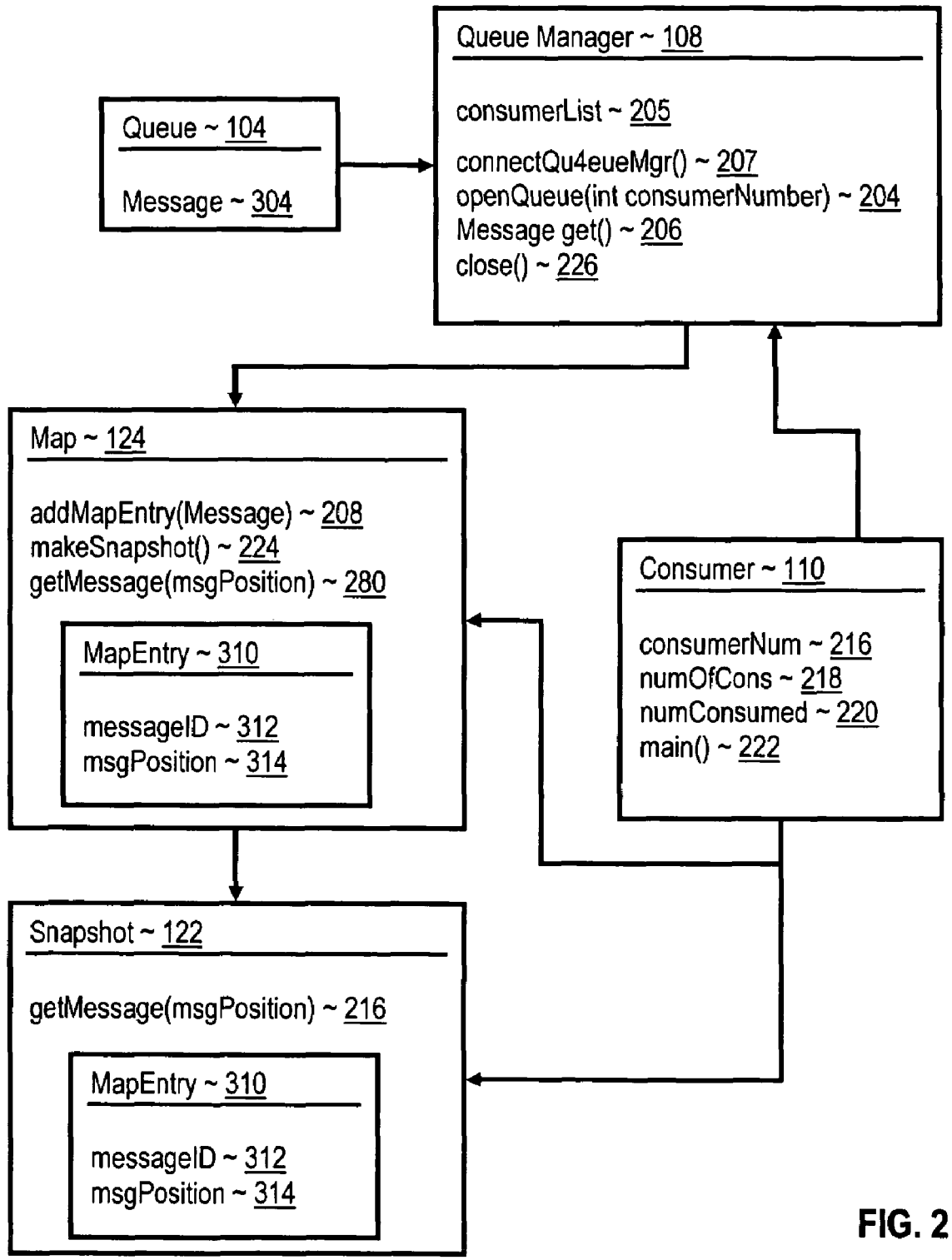
FIG. 2 sets forth a class relationship diagram illustrating classes useful in implementing methods of random access for processing messages in a message queue in accordance with the present invention.

FIG. 2 sets forth a class relationship diagram illustrating classes useful in implementing methods of random access for processing messages in a message queue in accordance with the present invention. The diagram of FIG. 2 includes a queue class (104) that represents a queue for storing messages (304). The diagram of FIG. 2 includes a queue manager class (108) that administers a queue on behalf of a number of consumers (110) identified in a consumerList (205). Queue manager (108) provides an exemplary method named connectQueueMgr() (207) that consumers and producers use to connect to queue managers in some systems for random access for processing messages in a message queue according to embodiments of the present invention.

Queue manager (108) also provides an openQueue() method (204) that opens a queue for a consumer for getting messages from the queue, creates a map of the queue, and returns to its calling consumer a reference to the map. In some embodiments that implement snapshots, openQueue() creates a snapshot (122) and returns to the calling consumer a reference to the snapshot. OpenQueue(), in this example, is parameterized with a consumer identification illustrated as an integer named consumerNumber (204). It is useful to note, that although in prior art a method like openQueue() in a point-to-point domain would open a queue for operations with only one consumer. OpenQueue() in this example, however, may be called any number of times by any number of instances of a consumer, to support multiple consumers to improve throughput from a queue. In such an embodiment, openQueue() is programmed to accept a consumer identification as a call parameter and list the consumer identification in a consumer list bearing identities of more than one consumer, such as the list illustrated at reference (205) on FIG. 2.

The queue manager (108) of FIG. 2 also includes a get() method (206) for getting messages from a queue and a close() method (226) for closing the queue. The get() method returns to a calling consumer a reference to a message. The close() method is useful in embodiments that utilize snapshots. The close() method may be parameterized with a consumer identification and is typically programmed to note in a consumerList (205) that it has been called by a consumer. When close() has been called by all of consumers identified in its list, close() closes the queue if there are no map entries in the map. If there are map entries, close() creates a new snapshot and returns a reference to the snapshot to the consumers. Map class (124) provides a member method named makeSnapshot() (224) for creating snapshots of a map.

The class diagram of FIG. 2 includes a consumer class (110) that provides a exemplary consumer identification field name exemplified as consumerNum (216). In this example, the consumer identification is taken as an ordinal value, here an integer. The exemplary consumer class (110) of FIG. 2 also includes a field named numOfCons (218) that records the number of consumers currently instantiated to process messages from the queue. The exemplary consumer class (110) includes a field named numConsumed (220) that records the number of messages processed by a consumer, that is, by an instance of the consumer class.

The consumer class (110) provides a main() method 222 that implements the business logic of a consumer. The main() method 222 is also programmed in typical embodiments of the present invention to identify the next message to consume by calculating a message position using its consumer number (216), the number of consumers (218), and the number of messages it has consumed (220). To support consumers in retrieving messages, snapshot class (122) provides a member method named getMessage(msgPosition) (216) that returns a message identification (312) when called with a message position (314) as a call parameter. Map (124) provides a similar getMessage() method (280) to support consumers in retrieving messages in embodiments that do not use snapshots. The message identification (312) may be implemented as a reference to a message object, in which case the consumer who receives it in return from Snapshot.getMessage() or Map.getMessage() may proceed to work on the message directly. Alternatively, message identification (312) may be implemented as a message identifier code, and a consumer who receives it in return from Snapshot.getMessage() or Map.getMessage() may use it to retrieve the message from a queue by calling QueueManager.get(msgID) (206).

The class diagram of FIG. 2 includes a map class (124) that represents relations among message identification (312) and message position (314). That is, map (124) in this example, provides map entries (310), each of which is composed of a message identification (312) and a message position (314) for a particular message in a queue (104). In typical embodiments, queue manager (108) adds an entry (310) in the map whenever a message (304) enters the queue (104). Map (124) provides a member method named addMapEntry(Message) (208) for adding map entries to a map. As mentioned, some Map embodiments provide a makeSnapshot() method (224) for creating snapshots of a map. In such embodiments, makeSnapshot() typically is programmed to instantiate a new snapshot object and move into the new snapshot all map entries (310) presently in the map. An exemplary snapshot class is shown at reference (122) in FIG. 2 as including map entries (310) relating message identifications (312) and message positions (314).

Figure 3:
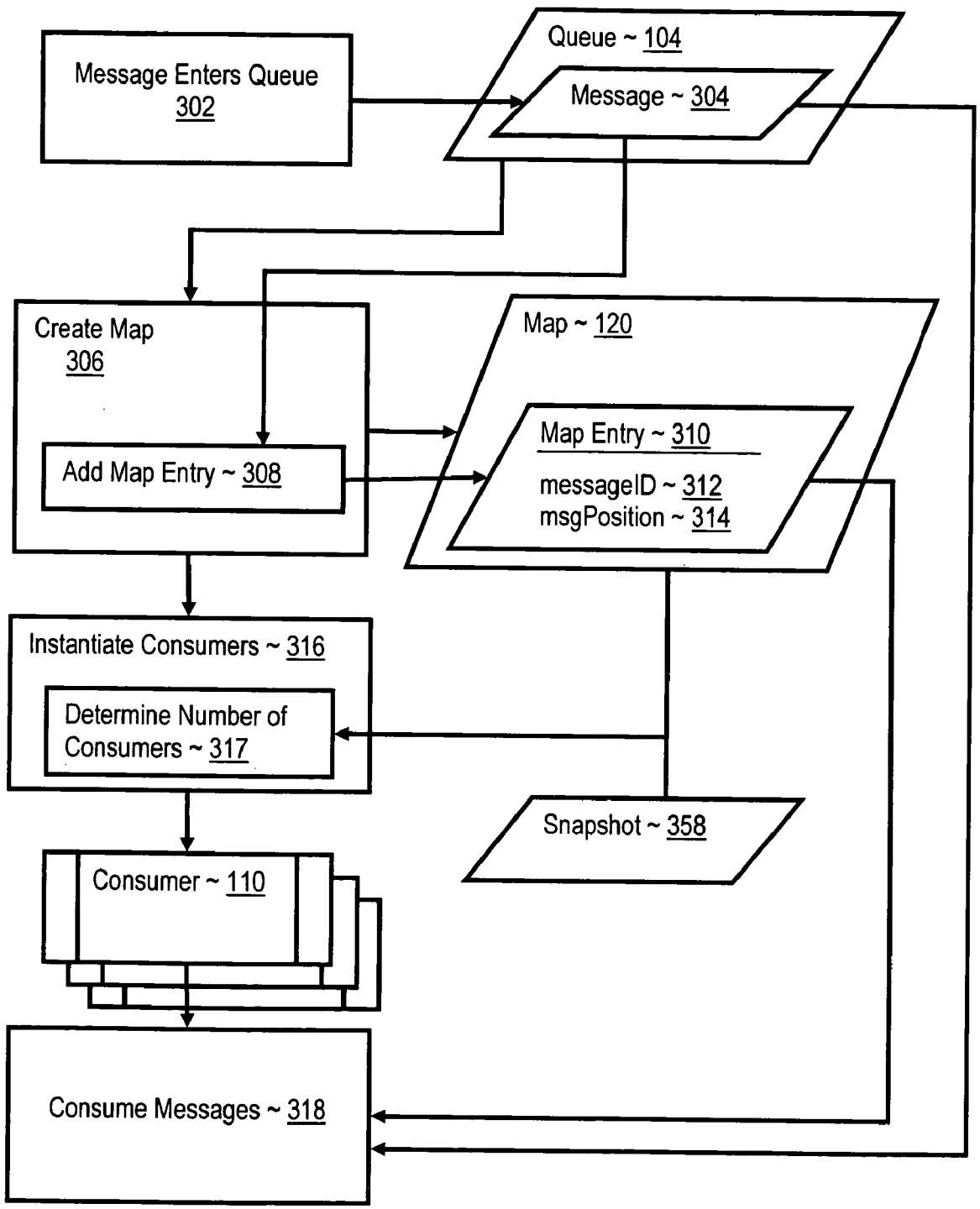
FIG. 3 sets forth a flow chart illustrating a method of random access for processing messages in a message queue that includes creating a map relating message identification and message position.

FIG. 3 sets forth a flow chart illustrating a method of random access for processing messages (304) in a message queue (104) that includes creating (306) a map (120) relating message identification (312) and message position (314), including adding (308) an entry (310) in the map whenever a message (304) enters (302) queue (104). Adding (308) an entry (310) in the map is, in some embodiments, carried out by calling a member method in a map class, such as for example addMapEntry(Message) illustrated as reference 208 in FIG. 2.

The method of FIG. 3 also includes instantiating (316) a plurality of consumers (110) for the messages (304). Instantiating (316) a plurality of consumers (110) typically includes determining (317) a number of consumers to instantiate. Determining a number of consumers to instantiate may be carried out in dependence upon the number of messages in a queue (104), the number of map entries in a map (120), the number of map entries in a snapshot (358), the time of day when high message traffic is expected, or in other ways as will occur to those of skill in the art. Determining the number of consumers may be carried out, for example, by dividing the number of entries (in a map or snapshot) by a threshold number, rounding the quotient to the nearest whole number, and instantiating that number of consumers.

Figure 4:
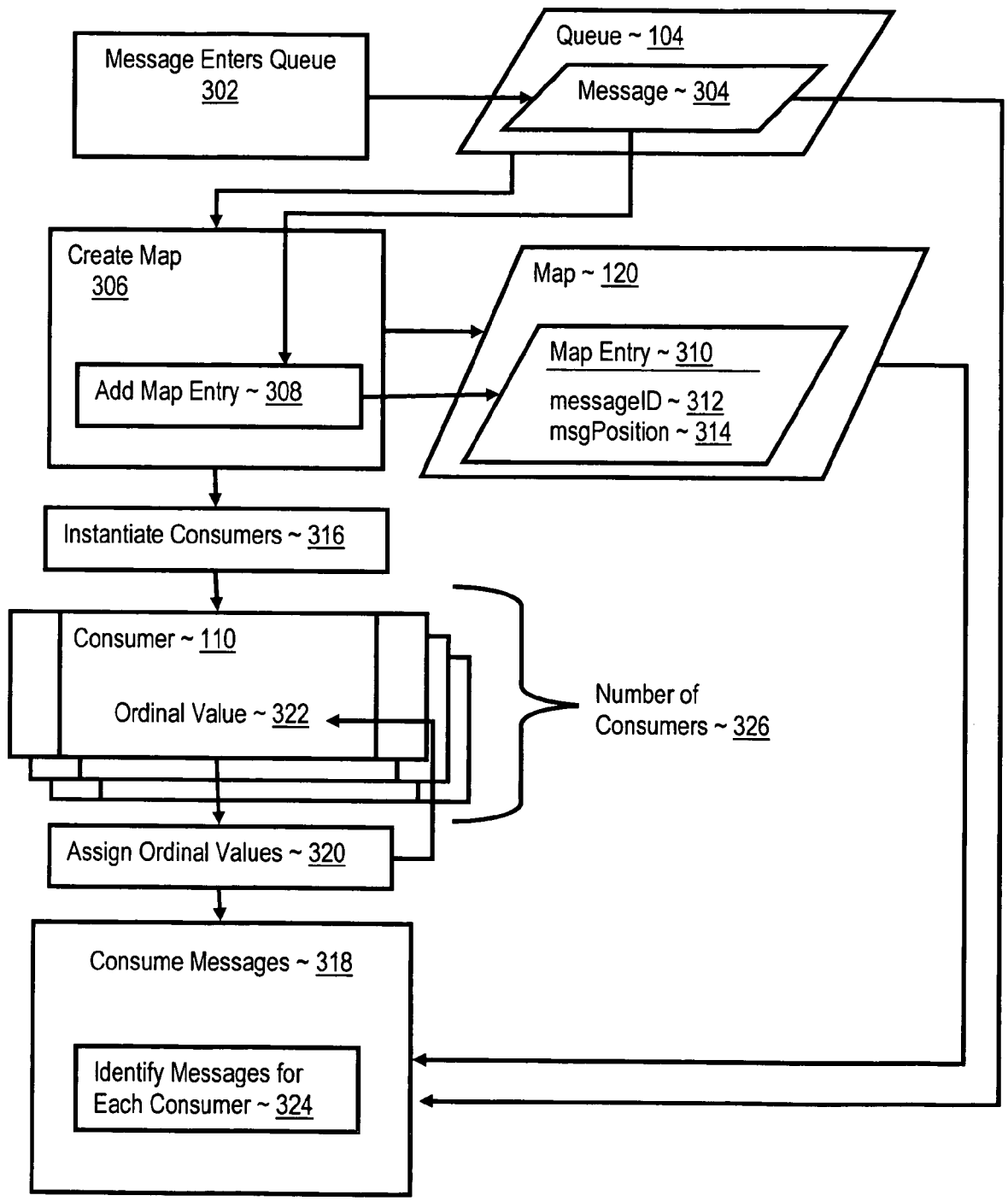
FIG. 4 sets forth a flow chart that illustrates a further method of random access for processing messages in a message queue.

The method of FIG. 3 also includes consuming (318), with the instances of a consumer (110), the messages (304) in dependence upon the map (120). An exemplary method of consuming messages in dependence upon a map is explained with reference to FIG. 4. FIG. 4 sets forth a flow chart that illustrates a further method of random access for processing messages (304) in a message queue (104) that is similar to the method of FIG. 3 in that it includes creating a map, instantiating consumers, and consuming messages in dependence upon the map. In the method of FIG. 4, however, the plurality of consumers comprises a particular number (326) of consumers and the method includes assigning (320) an ordinal value to each consumer (110). Also in the method of FIG. 4, consuming (318) the messages (304) is carried out by identifying (324) the messages to be processed by each consumer in dependence upon the ordinal values (322), the number of consumers (326), and the message positions (314).

An exemplary method of identifying (324) the messages (304) to be processed by each consumer (110) in dependence upon the ordinal values (322), the number consumers (326), and the message positions (314) in accordance with the method of FIG. 4 is to assign for consumption by a consumer a message having a message position identified by adding the ordinal value of the consumer to the product of the number of consumers multiplied by the number of messages consumed by the consumer. The message position of the next message for a consumer in this example is given by:

$$C_{Number} + (N_{Consumers} * M_{Consumed})$$

where $C_{Number}$=consumer number expressed as an ordinal value, $N_{Consumers}$=number of consumers instantiated for consuming messages, and $M_{Consumed}$=the number of messages consumed by the consumer.

For further explanation, consider an example for consumer number 1 of three consumers working on messages from a queue, where consumer number 1 has so far in its operations consumed 23 messages. The message position for the next message for this consumer is identified by adding the consumer's ordinal value, 1, to the product of the number of consumers, 3, and the number of messages consumed, 23. That is, the message position of the next message for consumer 1 is: 1+(3*23)=70. In summary, identifying messages to be processed by consumers according to this formula assigns to consumer number 1 of 3 the messages at message positions 1, 4, 7, 10, and so on. It assigns to consumer 2 of 3 the messages at message positions 2, 5, 8, 11, and so on. It assigns to consumer 3 of 3 the messages at message position 3, 6, 9, 12, and so on. Of course the invention is not limited to the use of three consumers. Any number of consumers may be used, and a similar progression will be obtained for any number of consumer in embodiments that utilize this formula for identifying messages to be processed by each consumer.

Figure 5:
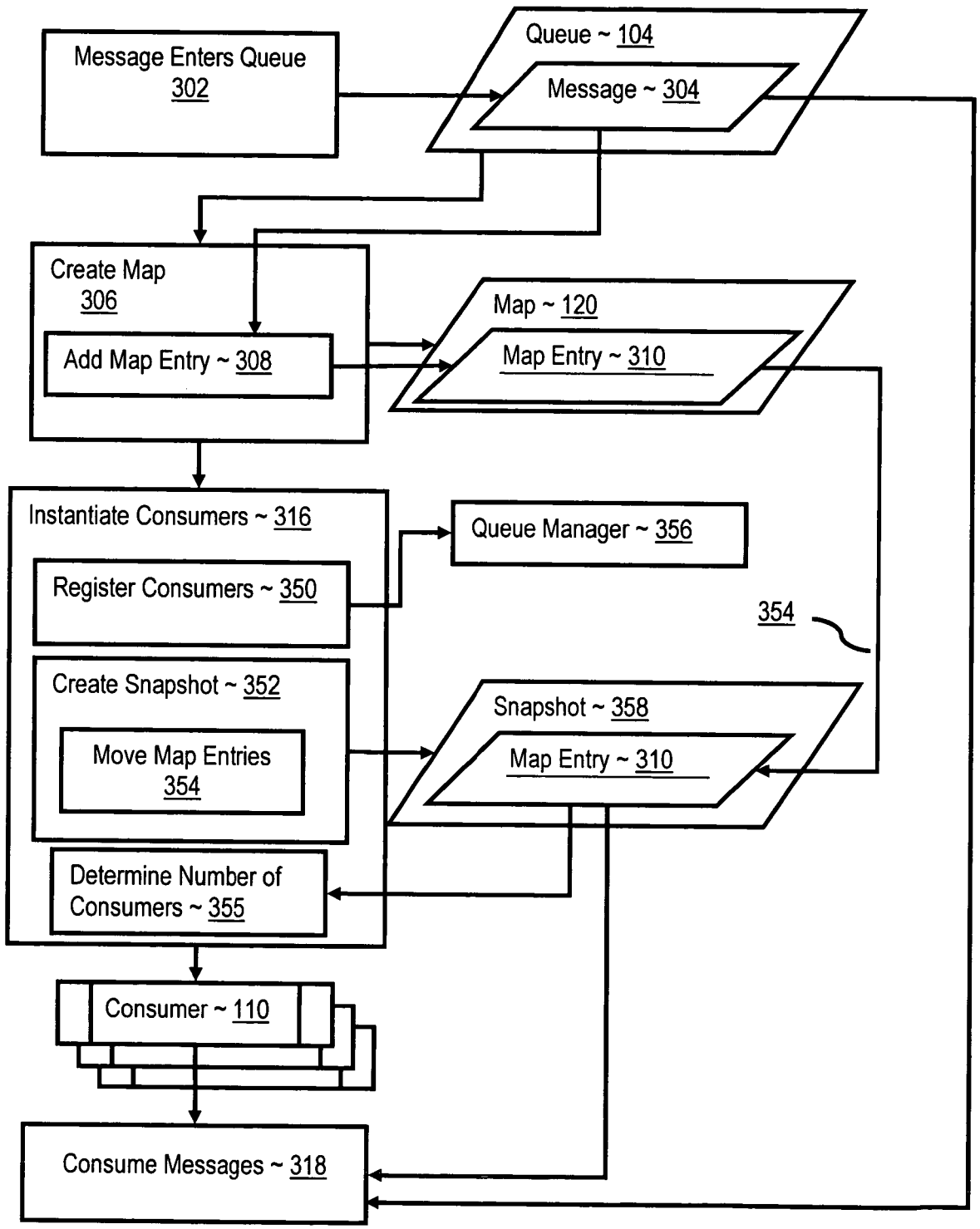
FIG. 5 sets forth a flow chart illustrating a still further method of random access for processing messages in a message queue.

FIG. 5 sets forth a flow chart illustrating a further method of random access for processing messages (304) in a message queue (104) in which instantiating (316) a plurality of consumers (110) is accomplished by registering (350) the consumers (110) with a queue manager (356) and creating (352) a snapshot (358) of the map (120). In this example, the snapshot is created when a first consumer is registered, and creating the snap shot includes moving (354) to the snapshot (358) all map entries (310) in the map (120) when the first consumer is registered. According to the method of FIG. 5, instantiating (316) a plurality of consumers (110) may include determining (355) a number of consumers in dependence upon the number of map entries (310) in the snapshot (358). Determining the number of consumers may be carried out by dividing the number of entries in the snapshot by a threshold number, rounding the quotient to the nearest whole number, and instantiating that number of consumers.

Figure 6:
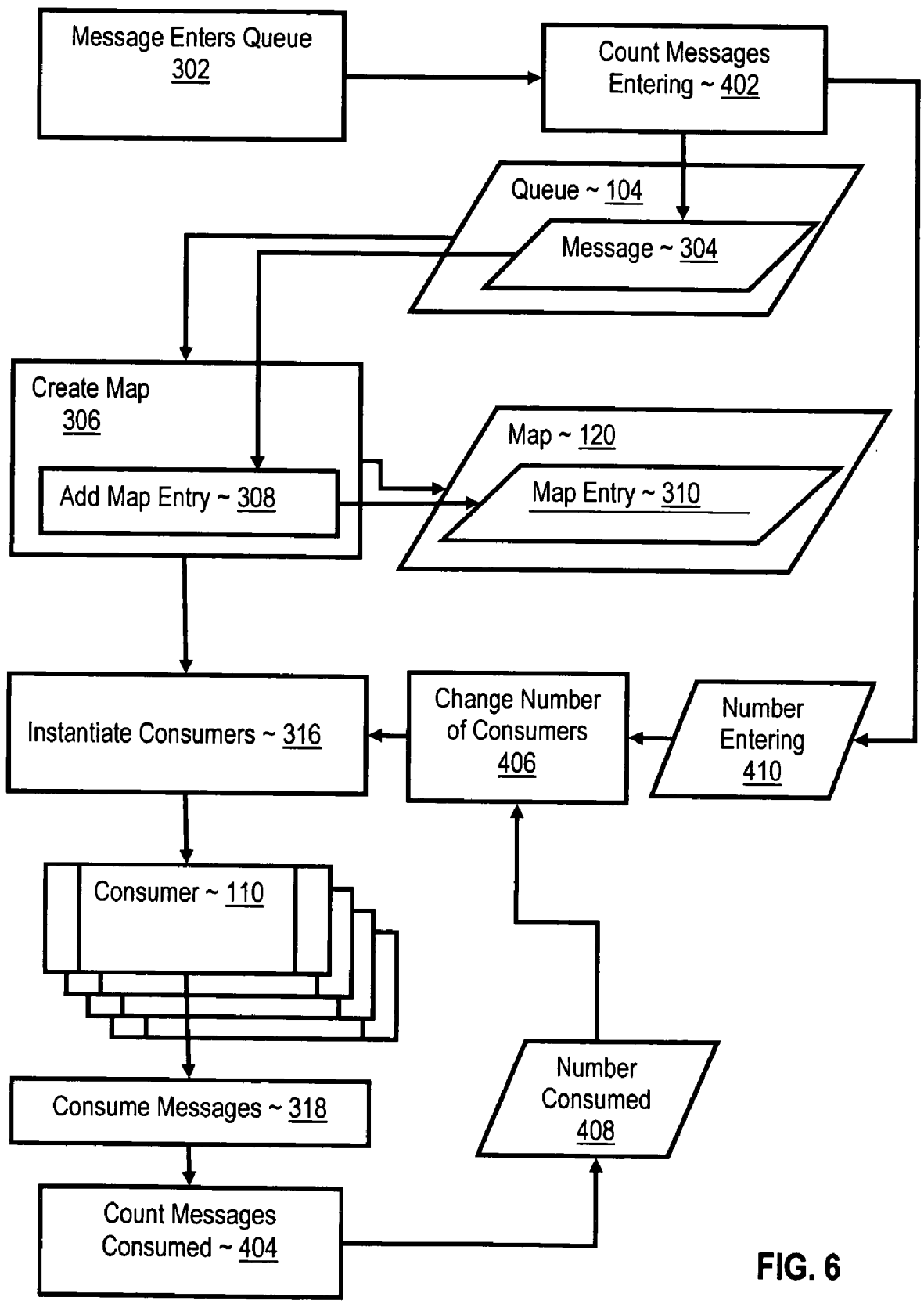
FIG. 6 sets forth a flow chart illustrating a method of determining a number of consumers in dependence upon the number of map entries in a map.

As mentioned earlier, methods according to embodiments of the present invention for instantiating (316) a plurality of consumers (110) may include determining a number of consumers in dependence upon the number of map entries (310) in a map (120). FIG. 6, by way of further explanation, sets forth a flow chart illustrating a method of determining a number of consumers in dependence upon the number of map entries (310) in a map (120). The method of FIG. 6 includes counting (402) messages (304) entering (302) the queue (104) and counting (404) messages (304) consumed (318) by the consumers (110). The method of FIG. 6 also includes changing (406) the number of consumers in dependence upon the number (408) of messages consumed and the number (410) of messages entering the queue. Changing (406) the number of consumers in dependence upon the number (408) of messages consumed and the number (410) of messages entering the queue may be carried out, for example, by increasing the number of consumers when the number of messages consumed is less than the number of messages entering a queue by some threshold amount. Similarly, changing (406) the number of consumers in dependence upon the number (408) of messages consumed and the number (410) of messages entering the queue may be carried out, for a further example, by decreasing the number of consumers when the number of messages consumed is greater than the number of messages entering a queue by some threshold amount.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of random access for processing messages in a message queue, the method comprising:

creating a map relating message identification and message position, including adding an entry in the map whenever a message enters the queue;

instantiating a number of consumer applications for the messages, including assigning an ordinal value to each consumer application; and consuming, with the consumer applications, the messages in dependence upon the map, including identifying the messages to be processed by each consumer application in dependence upon the ordinal value, the number of the consumer applications, and the message position, including assigning for consumption by a consumer application a message having a message position identified by adding the ordinal value of the consumer application to the product of the number of the consumer applications multiplied by the number of messages consumed by the consumer application.

2. The method of claim 1 wherein instantiating the number of the consumer applications further comprises:

registering the consumer applications with a queue manager; and creating a snapshot of the map when a first consumer application is registered, including moving to the snapshot all map entries in the map when the first consumer application is registered.

3. The method of claim 2 wherein instantiating the number of the consumer applications further comprises determining a number of the consumer applications in dependence upon the number of map entries in the snapshot.

4. The method of claim 1 wherein instantiating the number of the consumer applications further comprises determining a number of the consumer applications in dependence upon the number of map entries in the map.

5. The method of claim 1 further comprising:

counting messages entering the queue;

counting messages consumed by the consumer applications; and changing the number of the consumer applications in dependence upon the number of messages consumed and the number of messages entering the queue.

6. An apparatus providing random access for processing messages in a message queue, the apparatus comprising a computer processor, a computer memory operatively coupled to the computer processor, the computer memory having disposed within it computer program instructions capable when executed of causing the apparatus to carry out the steps of:

creating a map relating message identification and message position, including adding an entry in the map whenever a message enters the queue;

instantiating a number of consumer applications for the messages, including assigning an ordinal value to each consumer application; and consuming, with the consumer applications, the messages in dependence upon the map, including identifying the messages to be processed by each consumer application in dependence upon the ordinal value, the number of the consumer applications, and the message position, including assigning for consumption by a consumer application a message having a message position identified by adding the ordinal value of the consumer application to the product of the number of the consumer applications multiplied by the number of messages consumed by the consumer application.

7. The apparatus of claim 6 wherein instantiating the number of the consumer applications further comprises:
   registering the consumer applications with a queue manager; and
   creating a snapshot of the map when a first consumer application is registered, including moving to the snapshot all map entries in the map when the first consumer application is registered.

8. The apparatus of claim 7 wherein instantiating the number of the consumer applications further comprises determining a number of the consumer applications in dependence upon the number of map entries in the snapshot.

9. The apparatus of claim 6 wherein instantiating the number of the consumer applications further comprises determining a number of the consumer applications in dependence upon the number of map entries in the map.

10. The apparatus of claim 6 further comprising computer program instructions capable of causing the apparatus to carry out the steps of:
    counting messages entering the queue;
    counting messages consumed by the consumer applications; and
    changing the number of the consumer applications in dependence upon the number of messages consumed and the number of messages entering the queue.

11. A computer program product providing random access for processing messages in a message queue, the computer program product embodied on a computer-readable recording medium, the computer program product comprising computer program instructions, which when installed and executed on automated apparatus, perform the steps of:
    creating a map relating message identification and message position, including adding an entry in the map whenever a message enters the queue;
    instantiating a number of consumer applications for the messages, including assigning an ordinal value to each consumer application; and
    consuming, with the consumer applications, the messages in dependence upon the map, including identifying the messages to be processed by each consumer application in dependence upon the ordinal value, the number of the consumer applications, and the message position, including assigning for consumption by a consumer application a message having a message position identified by adding the ordinal value of the consumer application to the product of the number of the consumer applications multiplied by the number of messages consumed by the consumer application.

12. The computer program product of claim 11 wherein instantiating the number of the consumer applications further comprises:
    registering the consumer applications with a queue manager; and
    creating a snapshot of the map when a first consumer application is registered, including moving to the snapshot all map entries in the map when the first consumer application is registered.

13. The computer program product of claim 12 wherein instantiating the number of the consumer applications further comprises determining a number of the consumer applications in dependence upon the number of map entries in the snapshot.

14. The computer program product of claim 11 wherein instantiating the number of the consumer applications further comprises determining a number of the consumer applications in dependence upon the number of map entries in the map.

15. The computer program product of claim 11 further comprising computer program instructions capable of:
    counting messages entering the queue;
    counting messages consumed by the consumer applications; and
    changing the number of the consumer applications in dependence upon the number of messages consumed and the number of messages entering the queue.

* * * * *